(12) United States Patent
Osada

(10) Patent No.: US 8,438,217 B2
(45) Date of Patent: May 7, 2013

(54) PROGRAM-IMPLEMENTABLE IMAGE PROCESSING APPARATUS, CONTROL METHOD FOR IMAGE PROCESSING APPARATUS, CONTROL PROGRAM FOR REALIZING CONTROL METHOD, AND MEMORY MEDIUM

(75) Inventor: Mamoru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 12/510,389

(22) Filed: Jul. 28, 2009

(65) Prior Publication Data

US 2009/0284781 A1    Nov. 19, 2009

Related U.S. Application Data

(62) Division of application No. 10/347,683, filed on Jan. 22, 2003, now Pat. No. 7,590,682.

(30) Foreign Application Priority Data

Jan. 24, 2002  (JP) .................................. 2002-015654
Jan. 10, 2003  (JP) .................................. 2003-004823

(51) Int. Cl.
*G06F 15/16*         (2006.01)
(52) U.S. Cl.
USPC ........................... 709/203; 709/201; 709/202

(58) Field of Classification Search ........... 709/201–203
See application file for complete search history.

(56) References Cited

U.S. PATENT DOCUMENTS

| | | | |
|---|---|---|---|
| 5,544,045 A * | 8/1996 | Garland et al. ................... 704/3 |
| 5,913,072 A * | 6/1999 | Wieringa ......................... 710/12 |
| 6,091,508 A * | 7/2000 | Love et al. .................... 358/1.15 |
| 6,289,378 B1 * | 9/2001 | Meyer et al. ................... 709/223 |
| 6,298,421 B1 * | 10/2001 | Minamizawa et al. ....... 711/151 |
| 6,691,150 B1 * | 2/2004 | Yoshino et al. ............... 709/201 |
| 2003/0088651 A1 * | 5/2003 | Wilson, Jr. .................... 709/221 |

\* cited by examiner

*Primary Examiner* — Mohamed Wasel
(74) *Attorney, Agent, or Firm* — Fitzpatrick, Cella, Harper & Scinto

(57) ABSTRACT

An image processing apparatus is disclosed as an embodiment of the invention. The image processing apparatus which is connected to a communication network and can communicate with an outside includes an operating unit which allows the user to operate the image processing apparatus, a managing unit which manages a program and data existing in the image processing apparatus, an obtaining unit which obtains a program to control the image processing apparatus from an information processing apparatus connected via the communication network, a display unit which displays a screen according to the obtained program; a recognizing unit which recognizes an end of a process based on the program in the image processing apparatus, and a deleting unit which deletes the program in response to the end of the process of the program.

3 Claims, 9 Drawing Sheets

PROGRAM-IMPLEMENTABLE IMAGE PROCESSING APPARATUS, CONTROL METHOD FOR IMAGE PROCESSING APPARATUS, CONTROL PROGRAM FOR REALIZING CONTROL METHOD, AND MEMORY MEDIUM

This application is a divisional of Application No. 10/347,683, currently pending, filed Jan. 22, 2003.

BACKGROUND OF THE INVENTION

1. Field of the Invention

The invention relates to an image processing apparatus in which various kinds of programs can be implemented, a control method for the image processing apparatus, a control program for the image processing apparatus, and a memory medium in which the control program has been stored.

2. Related Background Art

Hitherto, in a system for executing some processes from an information processing apparatus (computer) such as a PC (personal computer) or the like to which an image processing apparatus (image forming apparatus) such as a hybrid apparatus or the like is connected via a communication network such as a network or the like, when a specific process is requested to the image processing apparatus by the PC or the like, there is used a method whereby a job corresponding to the process which is requested is inputted from the PC side, progress is observed, and a result is obtained, a method whereby only activation of the process is requested and the actual operation is executed by using a user interface on the image processing apparatus, or the like is used. In recent office environment, although many PCs have been introduced, scanners and hybrid apparatuses (MFP: Multi Function Peripherals) of the same number as that of the PCs do not always exist and there is also a case where the scanner is shared and used by a plurality of persons. In such a case, a distance between a place where the PC with which the operator is always working has been installed and a place where the scanner or the MFP has been installed is not always close.

SUMMARY OF THE INVENTION

In consideration of such a background, there is a problem such that work which is executed on the PC and work which is executed in the image processing apparatus that is away from the PC exist, so that the whole work is complicated. Specifically speaking, in the case of work such that an image of an original is read by the PC or the like by using the image processing apparatus, generally, after an original reading process is activated on the PC, the operator goes to the image processing apparatus and sets the original therein. Thereafter, he returns to the PC, executes the reading process, and finally, goes to the image processing apparatus again and collects the original, or the like. There is a problem such that he has to go and return twice between the PC and the image processing apparatus.

As another case, when the original reading process is requested to the image processing apparatus by the PC and residual processes are executed on the image processing apparatus, there is a problem such that since the processes have to be executed on an operation panel of the image processing apparatus by using the user interface having operability different from that on the PC, the operator has to understand the operation of the image processing apparatus.

In consideration of the above problems, the following apparatus is disclosed as an example of a system of the invention. That is, there is provided a network system including an information processing apparatus connected to a network and an image processing apparatus which can communicate with the information processing apparatus via the network. The information processing apparatus which can be connected to the network system comprises: input means for inputting an operation of the image processing apparatus; transfer control means for controlling a process to transfer a control program to the image processing apparatus; and limiting means for limiting the input in the input means in accordance with the transfer of the control program which is controlled by the transfer control means. The image processing apparatus comprises: obtaining means for obtaining the control program transferred in the transfer process which is controlled by the transfer control means; display control means for controlling a process to display an operating unit which can input a part or all of operations which can be inputted by the input means to a display unit onto an operation panel of the image processing apparatus by using the control program obtained by the obtaining means; recognizing means for recognizing an end of an operation; deleting means for deleting the control program in response to that the recognizing means recognizes the end of the operation; and notifying means for notifying the limiting means so as to cancel the limitation of the input by the input means in response to the deletion of the control program in the deleting means or the recognition of the end of the operation by the recognizing means.

Other features and advantages of the present invention will be apparent from the following description taken in conjunction with the accompanying drawings, in which like reference characters designate the same or similar parts throughout thereof.

BRIEF DESCRIPTION OF THE PREFERRED EMBODIMENTS

Each embodiment of the invention will be described hereinbelow with reference to the drawings.
(First Embodiment)

First, the first embodiment of the invention will be explained with reference to FIGS. 1 to 7.

Figure 1:
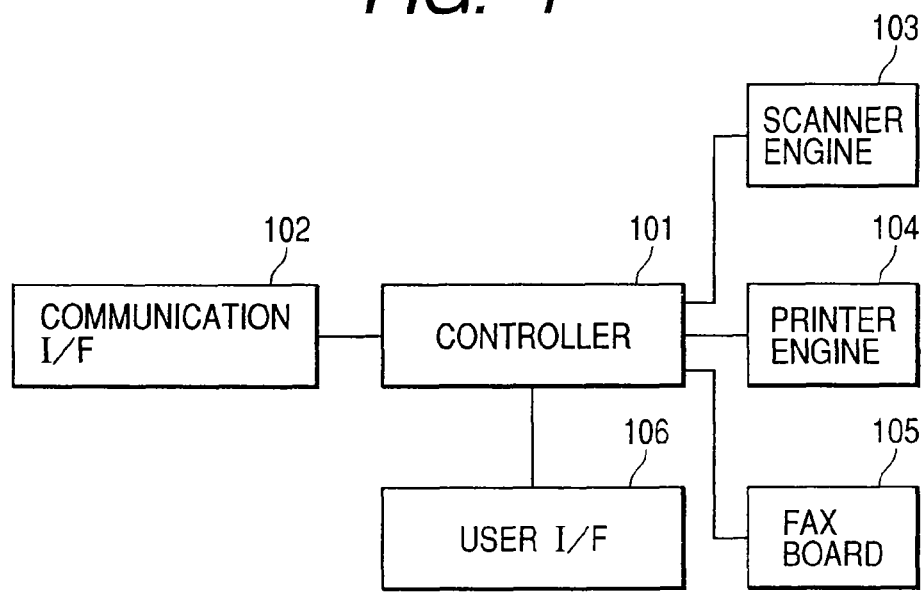
FIG. 1 is a block diagram showing a whole construction of an image processing apparatus according to a first embodiment of the invention.
Figure 2:
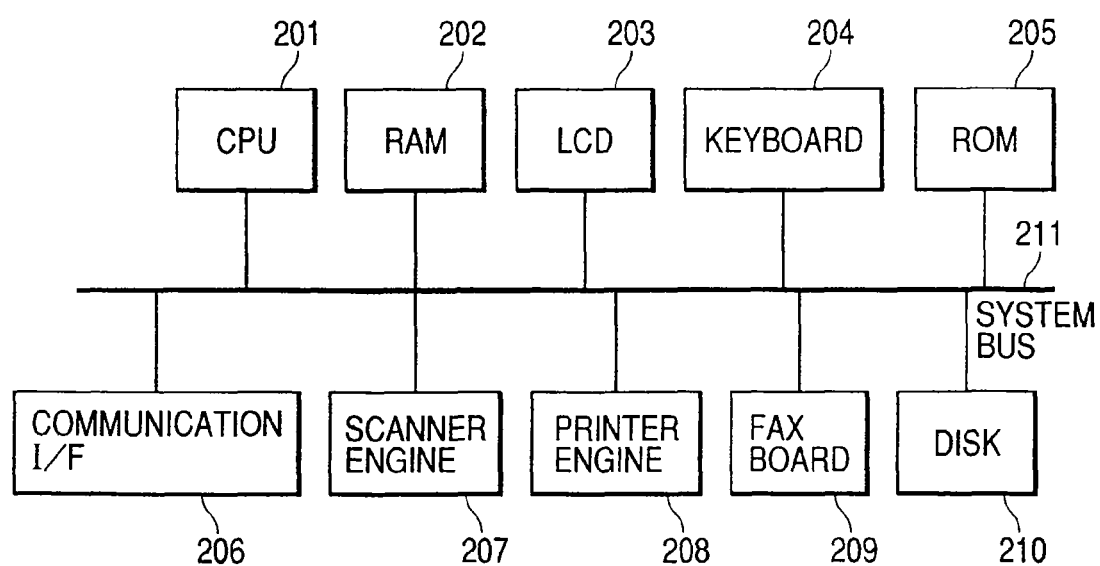
FIG. 2 is a block diagram showing an example of a hardware construction of a controller in FIG. 1.

FIG. 1 is a block diagram showing a whole construction of an image processing apparatus (image forming apparatus) according to the first embodiment of the invention. In the diagram, reference numeral 101 denotes a controller for controlling the whole image processing apparatus. The controller 101 has a hardware construction as shown in FIG. 2, which will be explained hereinlater. Reference numeral 102 denotes a communication interface for allowing the controller 101 to communicate with an external apparatus of an image processing apparatus. As a communication interface (I/F) 102, for example, it is possible to use an Ethernet (registered trademark) interface, an IEE1284 interface, or another communication interface can be used. Reference numeral 103 denotes a scanner engine which is controlled by the controller 101 and 104 indicates a printer engine which is controlled by the controller 101. For example, a laser beam printer, an ink jet printer, or another printer can be used as a printer engine 104. Reference numeral 105 denotes a facsimile (FAX) board for realizing an FAX function such as communication control or the like upon transmission and reception of an image. The FAX board 105 is controlled by the controller 101. Reference numeral 106 denotes a user interface (I/F) constructed by a display comprising an LCD (Liquid Crystal Display) or the like, a keyboard, and the like. The user I/F 106 has functions for displaying information from the controller 101 and transferring an instruction from the user to the controller 101.

The image processing apparatus according to the embodiment with the construction as mentioned above allows the scanner engine 103 to be selected and enables a scan job to be issued. The image processing apparatus also allows the printer engine 104 and the scanner engine 103 to be selected and enables a copy job to be issued. The image processing apparatus also allows the printer engine 104, the scanner engine 103, and the FAX board 105 to be selected and enables an FAX reception job and an FAX transmission job to be issued.

FIG. 2 is a block diagram showing a schematic construction of hardware regarding mainly the controller 101 in FIG. 1. As shown in FIG. 2, the controller 101 shown in FIG. 1 is constructed by mutually connecting the following component elements via a system bus 211: a CPU (Central Processing Unit) 201; an RAM (Random Access Memory) 202; an LCD 203; a keyboard 204; an ROM (Read Only Memory) 205; a communication interface 206; a scanner engine 207; a printer engine 208; an FAX board 209; and a DISK (memory means) 210.

A program to control the controller 101 in FIG. 1 has been stored in the ROM 205 or the DISK 210 and is read out therefrom and stored into the RAM 202 as necessary and executed by the CPU 201. Besides the control program, attribute information showing functions and statuses of the image processing apparatus and of jobs which are processed by the image processing apparatus, job data serving as a target of an output, and the like have been stored in the ROM 205 or the DISK 210. The CPU 201 allows the LCD 203 to display information, a message, or the like and receives an instruction from the user via the keyboard 204. The CPU 201 communicates with an external apparatus via the communication interface 206.

In the embodiment, in the image processing apparatus in FIG. 1, the CPU 201 receives an input of the user from the keyboard 204 via the system bus 211 and controls the RAM 202, LCD 203, ROM 205, communication interface 206, scanner engine 207, printer engine 208, FAX board 209, and DISK 210, thereby executing various processes unless otherwise specified.

Figure 3:
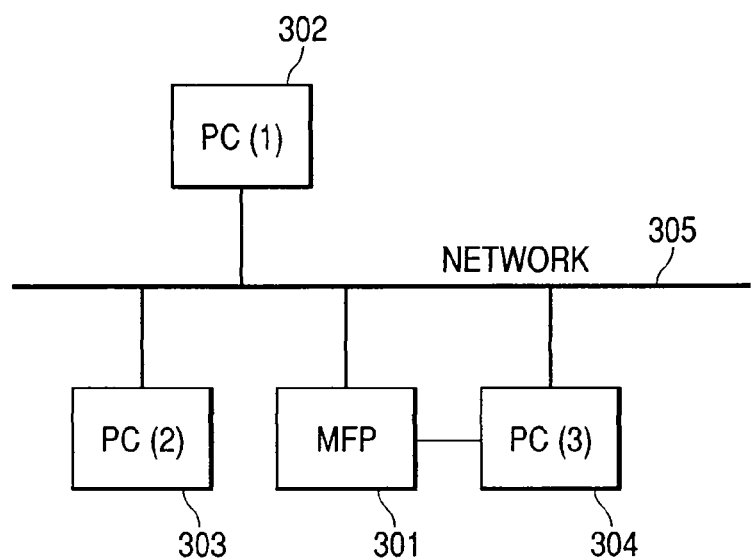
FIG. 3 is a block diagram showing an example of a network construction in which the image processing apparatus in FIG. 1 operates.
Figure 4:
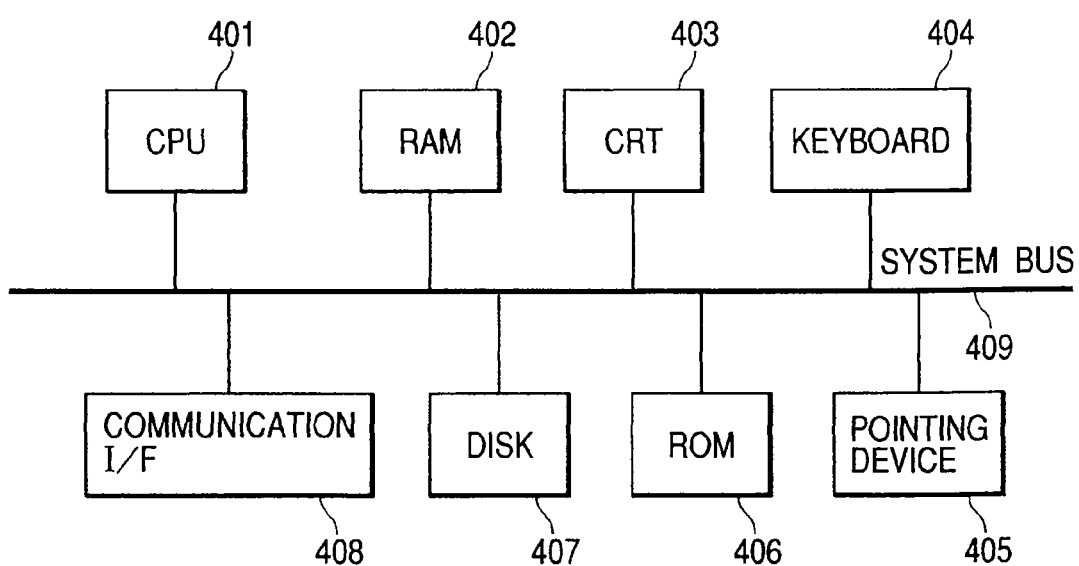
FIG. 4 is a block diagram showing an example of a hardware construction of a PC constructing a system of FIG. 3.

FIG. 3 is a block diagram showing an example of a construction of a network system in which the image processing apparatus shown in FIG. 1 operates. In the diagram, reference numeral 301 denotes an MFP (Multi Function Peripheral: hybrid apparatus having functions of a scanner, a printer, a facsimile, and the like). The MFP 301 corresponds to the image processing apparatus shown in FIG. 1. Reference numeral 302 denotes a PC(1); 303 a PC(2); and 304 a PC(3). Each of the PC(1) 302, PC(2) 303, and PC(3) 304 has a hardware construction as shown in FIG. 4, which will be explained hereinlater and indicates the PC (Personal Computer) connected to the MFP 301 via a network 305. A workstation, another image processing apparatus, or another equipment can be also connected to the MFP 301 via the network 305.

FIG. 4 is a block diagram showing the hardware construction of the PC constructing the network system of FIG. 3. As shown in FIG. 4, the PC is constructed by mutually connecting the following component elements via a system bus 409: a CPU 401; an RAM 402; a CRT (Cathode Ray Tube) 403; a keyboard 404; a pointing device 405; an ROM 406; a DISK 407; and a communication interface 408.

A program to control the PC has been stored in the ROM 406 or the DISK 407 and is read out therefrom and stored into the RAM 402 as necessary and executed by the CPU 401. The CPU 401 allows the CRT 403 to display and receives an instruction of the user from the keyboard 404 and the pointing device 405. The CPU 401 communicates with an external apparatus via the communication interface 408.

In the embodiment, in the PC in FIG. 4, the CPU 401 receives an input of the user from the keyboard 404 and the pointing device 405 via the system bus 409 and controls the RAM 402, CRT 403, ROM 406, DISK 407, and communication interface 408, thereby executing various processes unless otherwise specified.

Figure 5:
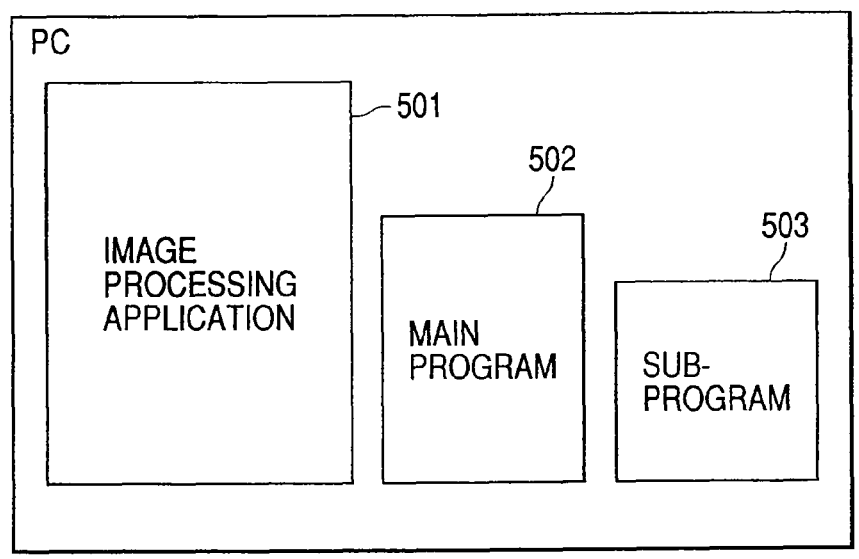
FIG. 5 is a diagram showing an example of a construction of software on the PC side according to the first embodiment of the invention.

FIG. 5 is a diagram showing a construction of software on the PC side embodying the invention.

Each software can exist on the PC of any one of the PC(1) 302, PC(2) 303, and PC(3) 304.

Each software has been stored in the DISK 407 or the like and is activated by the user via the keyboard 404 or the like. The activated software is developed into the RAM 402 by the CPU 401, thereby enabling the operation from the user via the CRT 403 and keyboard 404. The activated software activates another application as necessary by the operation from the user, thereby providing a desired function to the user.

In FIG. 5, reference numeral 501 denotes a general image processing application for providing a function such as display and editing of an image data file stored in the DISK 407 or the like, fetching of image data via the communication interface 408, or the like to the user. Reference numeral 502 denotes a main program of the invention and it is a program for intervening the obtainment of the image data from the image processing application 501 which operates on the PC and the MFP 301. This program is activated by an instruction from the image processing application 501. Reference numeral 503 denotes a subprogram of the invention and it is a program which is transferred to the MFP 301 and executed thereon in accordance with a flowchart shown in FIG. 6, which will be explained hereinlater. The subprogram 503 can be held as data in the main program 502 or can be also held in the PC, as a substance different from the main program 502. A format of the subprogram held in the PC is not specified.

Figure 12:
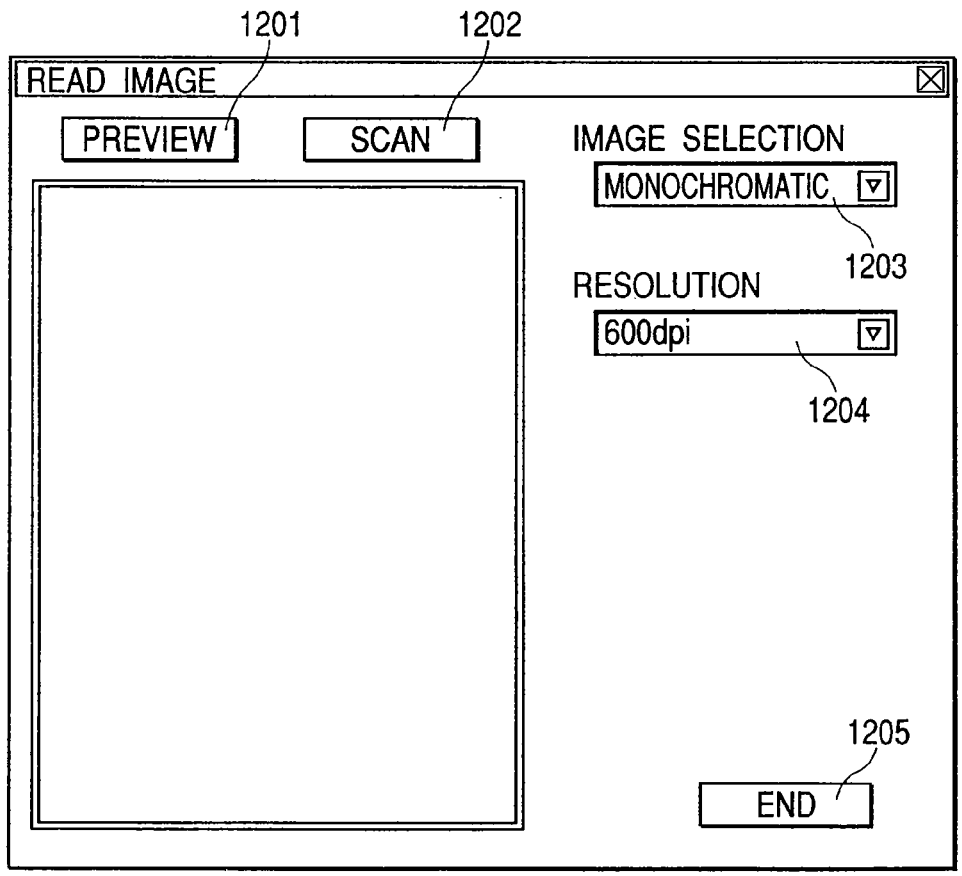
FIG. 12 is a diagram showing a display picture plane on the PC before the subprogram 503 transmits data to the MFP.

FIG. 12 is a diagram showing a display picture plane on the PC before the PC transmits the subprogram 503 to the MFP. In the image processing application on the PC, a picture plane which is obtained after the user designated a scanner on the reading destination side and called a scanner driver is displayed here. A preview button 1201 is a button for instructing the apparatus to scan an original and display a preview image. A scan button 1202 is a button for instructing so as to scan the original, form image data, and store it onto a hard disk. An image selecting unit 1203 is constructed by, for example, a pull-down menu and is a selecting unit which can instruct and select reading attributes such as monochromatic, gray scale, color, or the like of the original in the scanner. A resolution selecting unit 1204 is a selecting unit which can designate resolution of the original in the scanner.

An END button 1205 is an instructing unit which can instruct the end of the subprogram which becomes unnecessary after completion of the process in the MFP or the PC.

Figure 6:
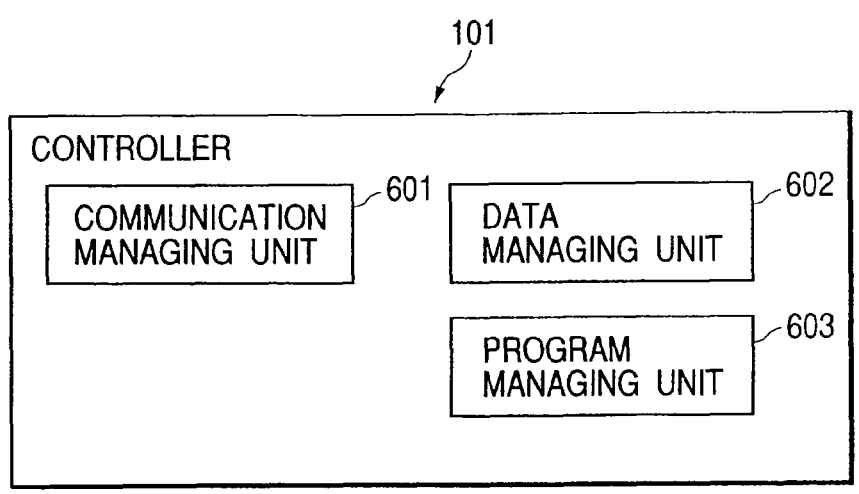
FIG. 6 is a diagram showing a construction of a part in the controller in the image processing apparatus according to the first embodiment of the invention.

FIG. 6 is a diagram showing a part of the construction of the controller 101 of the MFP 301 as an image processing apparatus embodying the invention. In the diagram, reference numeral 601 denotes a communication managing unit (communication managing means) for analyzing a communication command which is transmitted and received via the communication interface 206 and makes communication control. Reference numeral 602 denotes a data managing unit (data managing means) for managing various data which are controlled by the controller 101. Reference numeral 603 denotes a program managing unit (program managing means) for controlling execution of a resident or non-resident program managed by the data managing unit 602.

Figure 7:
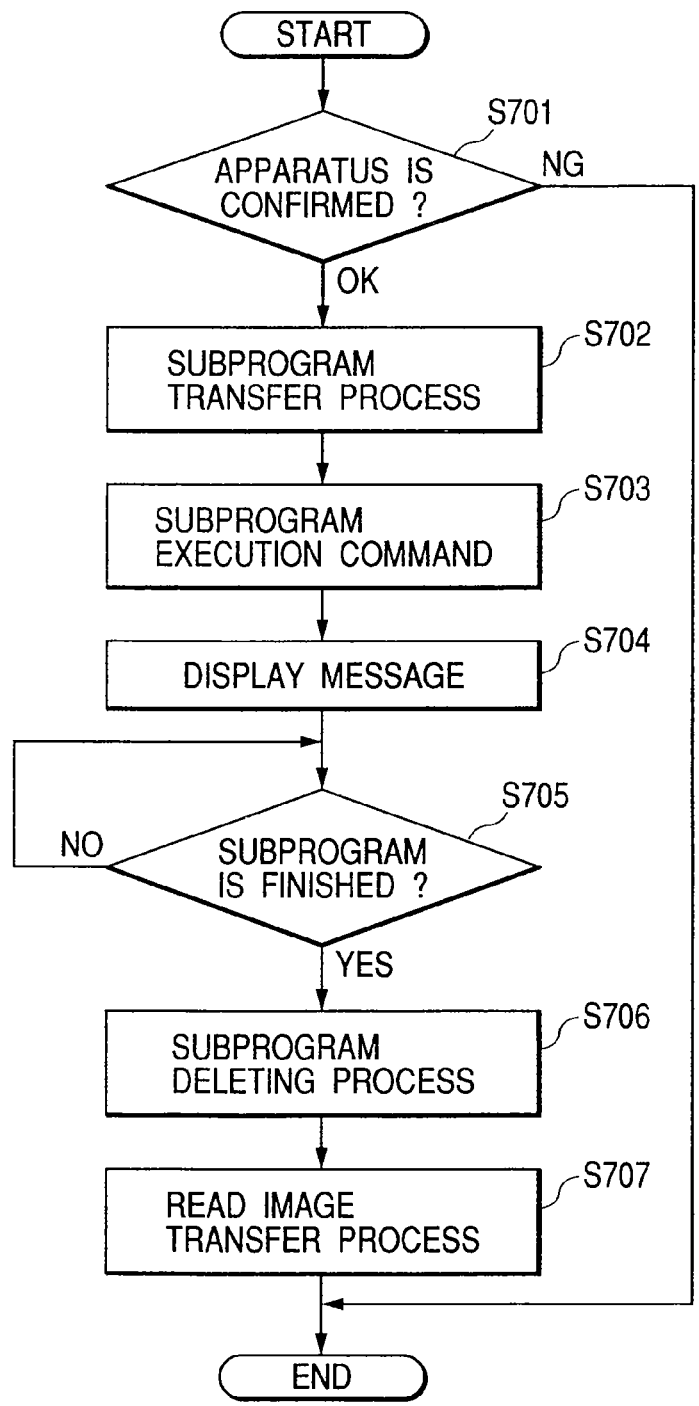
FIG. 7 is a flowchart showing a flow of the operation of a main program of software on the PC side according to the first embodiment of the invention.

FIG. 7 is a flowchart showing a flow of the operation of the main program 502 of the software on the PC side embodying the invention.

A series of processes shown in the flowchart can be automatically executed in the case where a power source of the PC is turned on, can be executed in the case where the user allows the picture plane shown in FIG. 12 to be displayed on a monitor of the PC, or can be also executed in response to timing when the user operates the pointing device and selects and instructs the scanner or the scanner driver corresponding to the scanner before the picture plane shown in FIG. 12 is displayed.

In the diagram, in step S701, the main program 502 confirms whether the corresponding image processing apparatus has been connected or not. In this step, the presence or absence of the MFP 301 is discriminated via the communication interface 408 on the basis of the information obtained from the image processing application 501 on the activating source side.

If the MFP 301 does not exist as a result of the discrimination in step S701, no process is executed, the present processing operation is finished, and the process is returned to the image processing application 501. Before the program is sent from the PC, an operating unit as shown in FIG. 10 is displayed on the LCD 203 on the MFP side.

Figure 10:
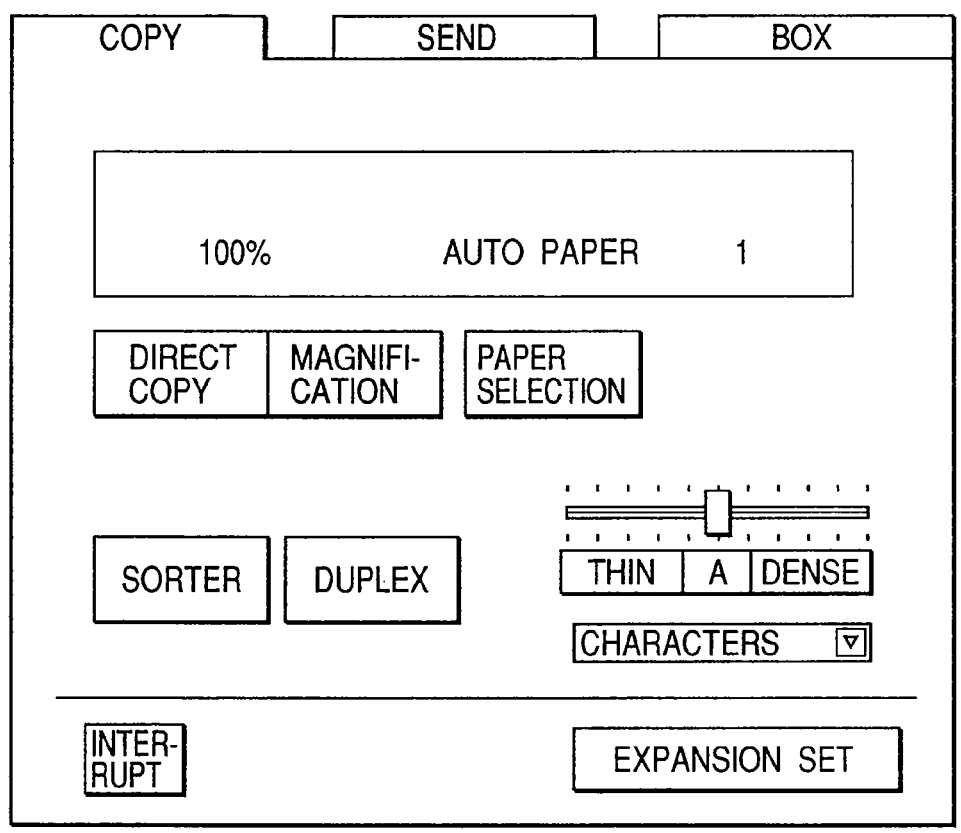
FIG. 10 is a diagram showing a display picture plane on an MFP before a subprogram 503 is received.

FIG. 10 shows a copy tab for instructing a copy function, a transmission tab for instructing a transmitting function, and a BOX tab for instructing a function to manage the data read into a BOX of a copying apparatus, respectively. However, since a PC scanning function is not implemented yet, a tab corresponding thereto is not displayed on the LCD 203 as an operating unit.

In step S702, the subprogram 503 is transferred to the MFP 301. A program file on the DISK 407 is transferred via the communication interface 408. At this time, in the communication managing unit 601, a command and data from the main program 502 are analyzed and the subprogram 503 is stored into the DISK 210 or RAM 202 via the data managing unit 602.

Figure 13:
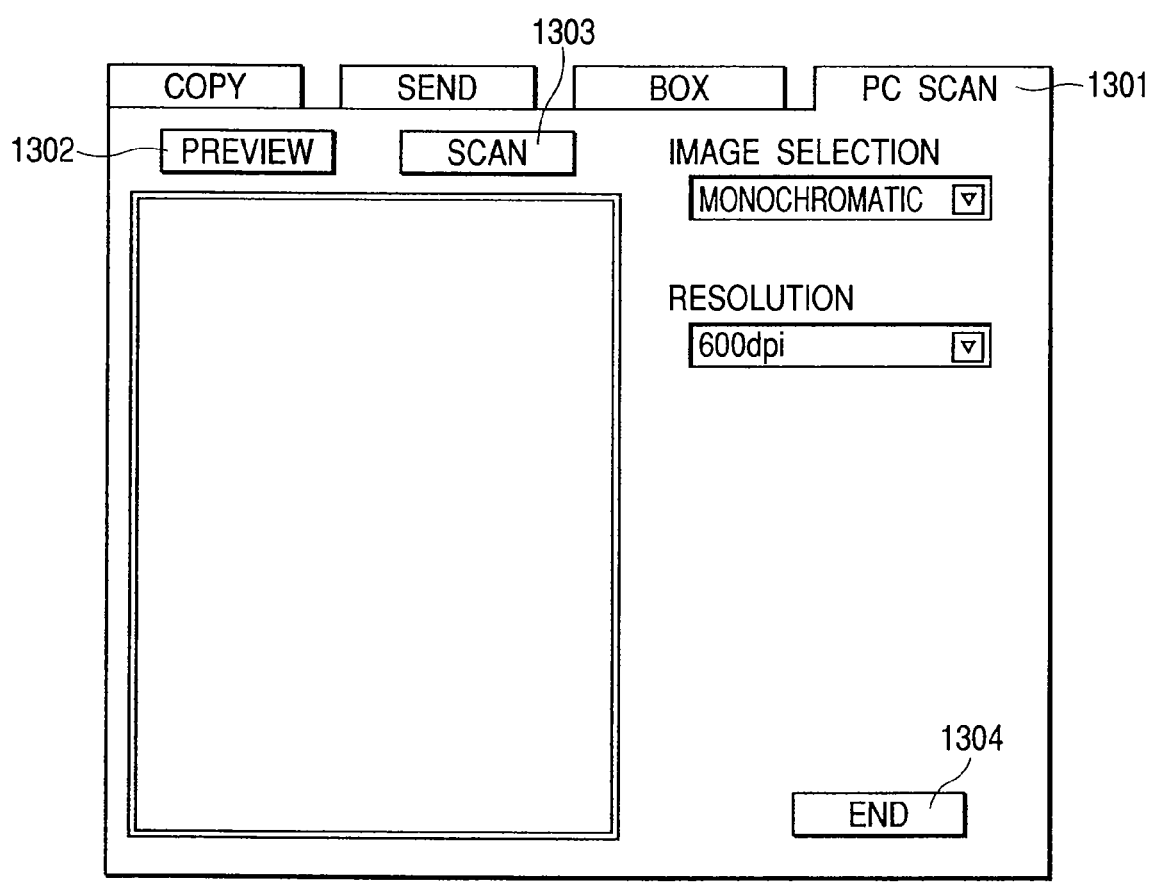
FIG. 13 is a diagram showing a display picture plane on the MFP of the subprogram 503.

After the subprogram was transmitted to the MFP, as shown in FIG. 13, a PC scan tab 1301 appears. In a manner similar to FIG. 10, FIG. 13 displays a copy tab for selecting and instructing a task of the copy function, a transmission tab for selecting and instructing a task of the transmitting function, and a BOX tab for instructing a task of the managing function to manage data read into the BOX of the copying apparatus, respectively. In addition to those tabs, the PC scan tab 1301 for selecting and instructing a task indicative of the PC scanning function is added and displayed so that it can be discriminated. The diagram shows a state where the PC scan tab has been selected and activated. This diagram realizes a function and a user interface which are almost similar to those in FIG. 12. The preview button 1201 shown in FIG. 12 realizes a function similar to that of a preview button 1302 in FIG. 13. The scan button 1202 in FIG. 12 realizes a function similar to that of a scan button 1303 in FIG. 13. Other image selecting unit and resolution instructing unit are also constructed in a manner similar to those mentioned above.

If the subprogram 503 is included in the main program 502, only the subprogram portion can be transferred or it can be also transferred every main program 502. If the subprogram 503 is transferred every main program 502, it is also possible to previously program so as to switch an operating mode by a program activating command or the like, which will be explained hereinlater.

In step S703, a command to execute the subprogram 503 stored in step S702 is transmitted to the CPU 201 of the MFP 301. At this time, in the communication managing unit 601, the command sent from the main program 502 is analyzed, thereby instructing the program managing unit 603 to execute the program stored in step S702.

Figure 11:
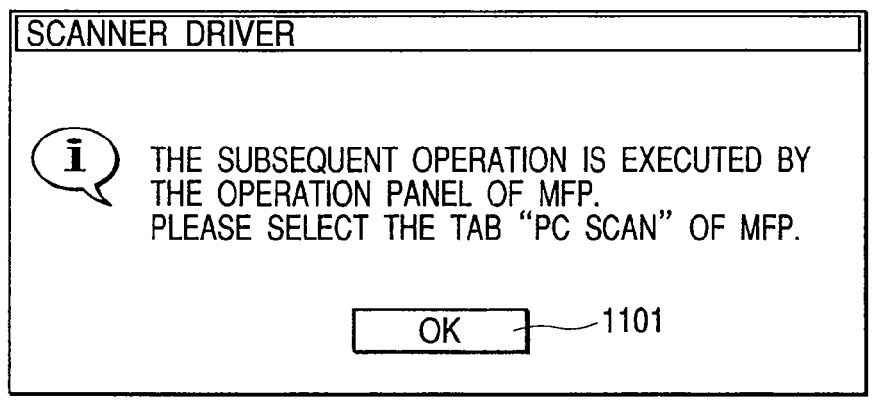
FIG. 11 is a diagram showing a display message at the time when a scanner is selected as an MFP by an image processing application in step S704.

FIG. 11 is a diagram showing a message for permitting the continuation of the original reading operation on the MFP 301. In step S704, a picture plane as shown in FIG. 11 is displayed on the monitor and a message to urge the user to execute the original reading operation by the MFP 301 is displayed. It is desirable that the subprogram which has already been transferred is activated in response to the operation such that the user inputs and instructs the OK button in FIG. 11 by using the pointing device. It is assumed that after the OK button is instructed, in the MFP 301, the subprogram 503 is executed in the program managing unit 603 and a data reading process from the original is executed on the MFP 301. It is also possible to construct in a manner such that after the OK button is pressed, only the operation of the scanner provided for the MFP on the PC side is locked in order to prevent competition of the operation from the PC with the operation from the scanner or the MFP.

In step S705, whether the execution of the subprogram 503 has been finished on the MFP 301 or not is discriminated. As for the confirmation of the end of the execution, in the case of periodically confirming the end of the execution from the main program 502, the communication managing unit 601 is inquired via the communication interface 408. In the communication managing unit 601, an inquiry command is analyzed and the program managing unit 603 is inquired about a situation of the subprogram 503. In the case of using the method of waiting for a notification from the subprogram 503 upon confirmation of the end of the execution, an executing situation of the subprogram 503 is monitored in the program managing unit 603. If the program is finished, it is also possible to instruct the communication managing unit 601 to issue an end command and notify the main program 502 of the end command.

In step S706, the subprogram 503 on the MFP 301 transferred in step S702 is deleted. The main program 502 issues a deletion command of the program via the communication interface 408. At this time, the communication managing unit 601 analyzes the command and instructs the program managing unit 603 to delete the subprogram 503. The program managing unit 603 instructs the data managing unit 602 to delete the program data in accordance with the deleting instruction. The process in step S706 can be also executed after step S707, which will be explained hereinlater. When the completion of execution of the subprogram 503 is detected in the program managing unit 603, if the program managing unit 603 instructs the data managing unit 602 to automatically delete the subprogram 503, step S706 can be omitted.

In step S707, as a result of that the subprogram 503 was executed on the MFP 301, the image data stored in the DISK 210 or the RAM 202 is extracted to a predetermined area (on the DISK 407 or the ROM 406) instructed by the image processing application 501 on the PC. The process in step S707 can be also executed before step S706 mentioned above. With respect to the method of transferring the read image data, after a series of reading processes was completed, they can be transferred in a lump as shown in the embodiment or it is also possible to transfer the read image data every reading of one original by devising the process. It is not particularly limited to the method described in the embodiment.

The main program 502 is finished when a series of processes is completed.

With respect to the transfer of the subprogram 503 designated in step S702 mentioned above, it is possible that the main program 502 transfers the subprogram 503 to the MFP 301 and instructs it to execute the subprogram as shown in the embodiment. It is also possible to construct the system in a manner such that a command indicative of an instruction for both of the transfer of the program and the execution of the program is sent from the main program 502 and the MFP 301 downloads the subprogram 503 from the PC in which the main program 502 exists and executes it.

After completion of the process in step S707, the present processing operation is finished.

If the operation of the scanner provided for the MFP on the PC side is locked on the PC side after the instruction of the OK button in FIG. 11 as mentioned above, there is also a case where the locking state is cancelled in response to the detection of the notification of the end command of the subprogram for reading on the scanner side.

For example, it is also possible to construct the system in a manner such that when the user finishes the reading process of the scanner in the MFP and presses an END button 1304 of an operating unit in FIG. 13 which is displayed on the LCD 203, the subprogram for realizing the scanning function is deleted and a memory occupied by the subprogram is released. The PC scan tab 1301 corresponding to the program for realizing the finished process in FIG. 13 is erased and an operating unit as shown in FIG. 10 is displayed on the LCD 203. At the same time, an end notification is transmitted from the MFP to the PC.

Naturally, it is also possible to construct the system in a manner such that even in the case where the program is automatically deleted or the case where the program is deleted in response to an instruction from the PC, the screen is shifted to the picture plane as shown in FIG. 10 from that of FIG. 13 in response to the deleting process or deleting instruction of the program and the tab corresponding to the task program whose deletion has been instructed is extinguished.

(Second Embodiment)

The second embodiment of the invention will now be described with reference to FIGS. 8 and 9.

Since a fundamental construction of an image processing apparatus according to the second embodiment of the invention is the same as that shown in FIGS. 1 to 6 in the foregoing first embodiment, it will be explained also with reference to those diagrams as necessary.

Figure 8:
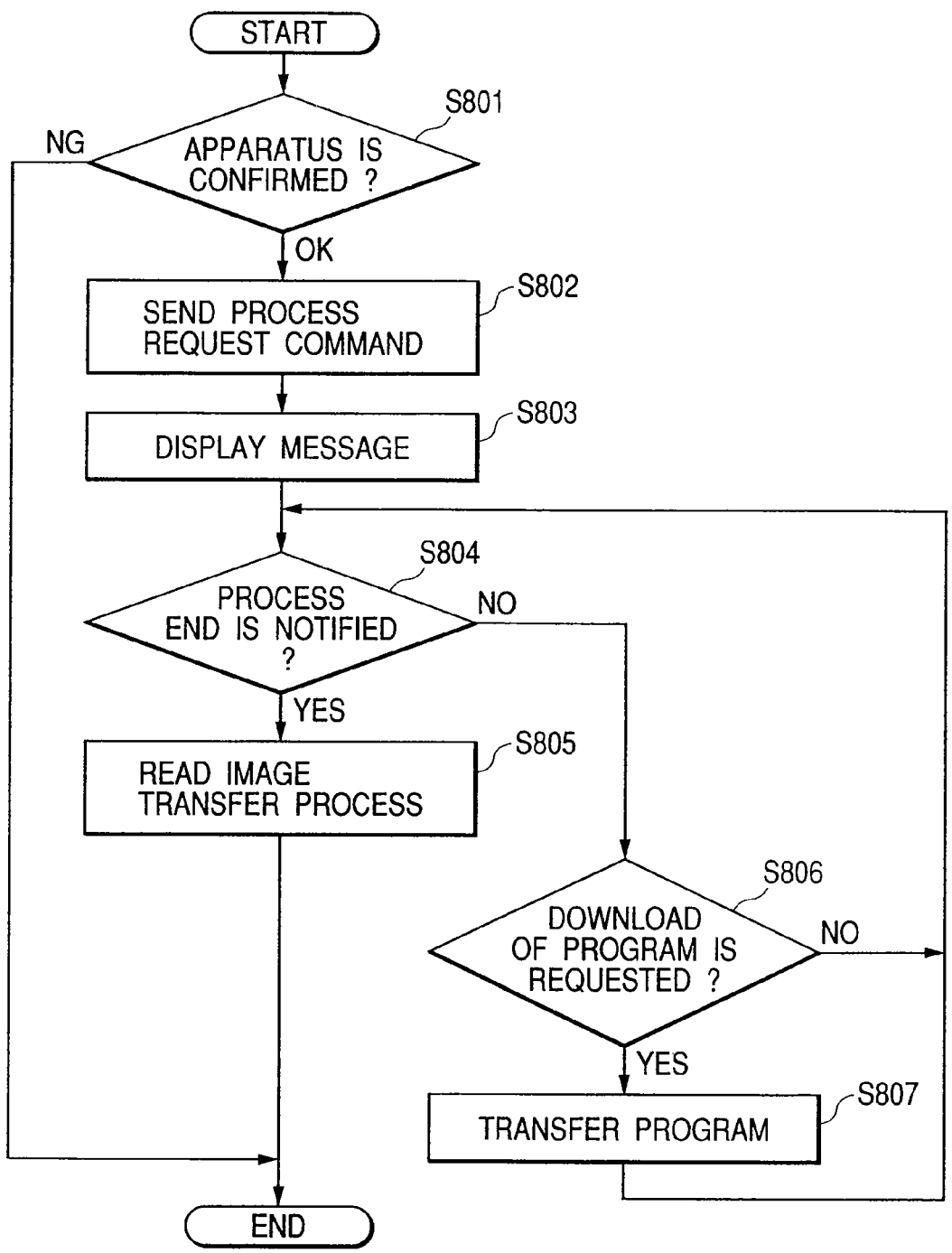
FIG. 8 is a flowchart showing a flow of the operation of a main program of software on the PC side according to the second embodiment of the invention.

FIG. 8 is a flowchart showing a flow of the operation of the main program 502 of the software on the PC side in the image processing apparatus according to the second embodiment of the invention.

In FIG. 8, in step S801, the main program 502 confirms whether the corresponding image processing apparatus has been connected or not. In this step, the presence or absence of the MFP 301 is discriminated via the communication interface 206 on the basis of the information obtained from the image processing application 501 on the activating source side.

If the MFP 301 does not exist as a result of the discrimination in step S801, no process is executed, the present processing operation is finished, and the process is returned to the image processing application 501. Before the program is sent from the PC, the operating unit as shown in FIG. 10 is displayed on the LCD 203 on the MFP side. The copy tab for instructing the copy function, the transmission tab for instructing the transmitting function, and the BOX tab for instructing the function to manage the data read into the BOX of the copying apparatus are displayed, respectively. However, since the PC scanning function is not implemented yet, a tab corresponding thereto is not displayed on the LCD 203 serving as an operating unit.

In step S802, a process request command to start the original reading process is sent to the MFP 301. Since the command is sent to the MFP 301 in step S802, processes shown in FIG. 9, which will be explained hereinlater, are executed in the MFP 301.

In step S803, a message for urging the user to execute the reading operation of the original by the MFP 301 is displayed. It is assumed that the user executes the operation in the MFP 301 in order to execute the original reading process.

In step S804, a process end notification which is notified in the case where the operation is completed on the MFP 301 via the communication interface 408 is detected. If the completion of the process is notified, step S805 follows. If it is not notified, step S806 follows.

The detection of the process end notification in step S804 can be realized by the reception of the command as shown in the embodiment or can be also realized by inquiring of the MFP 301.

In step S805, the read image is transferred. In this step, the read image is extracted from the MFP 301 via the communication interface 408 and stored into a predetermined area (on the DISK 407 or the ROM 406) which is instructed by the image processing application 501 on the PC. With respect to the method of transferring the read image data, after a series of reading processes is completed, they can be transferred in a lump as shown in the embodiment or the read image data can be also transferred every reading of one original by devising the processes. Such a method is not particularly limited to the method in the embodiment.

After all read images are transferred, the present processing operation is finished and the processing routine is returned to the image processing application 501.

In step S806, a program download request command from the MFP 301 is detected. If the program download request command is detected, step S807 follows. If NO, the processing routine is returned to step S804 and the detecting process of the process end notification is continued.

In step S807, the subprogram 503 is transferred to the MFP 301. In this step, the program file on the DISK 407 is transferred via the communication interface 408. If the subprogram 503 is included in the main program 502, only the subprogram portion can be transferred or it can be also transferred every main program 502.

Figure 9:
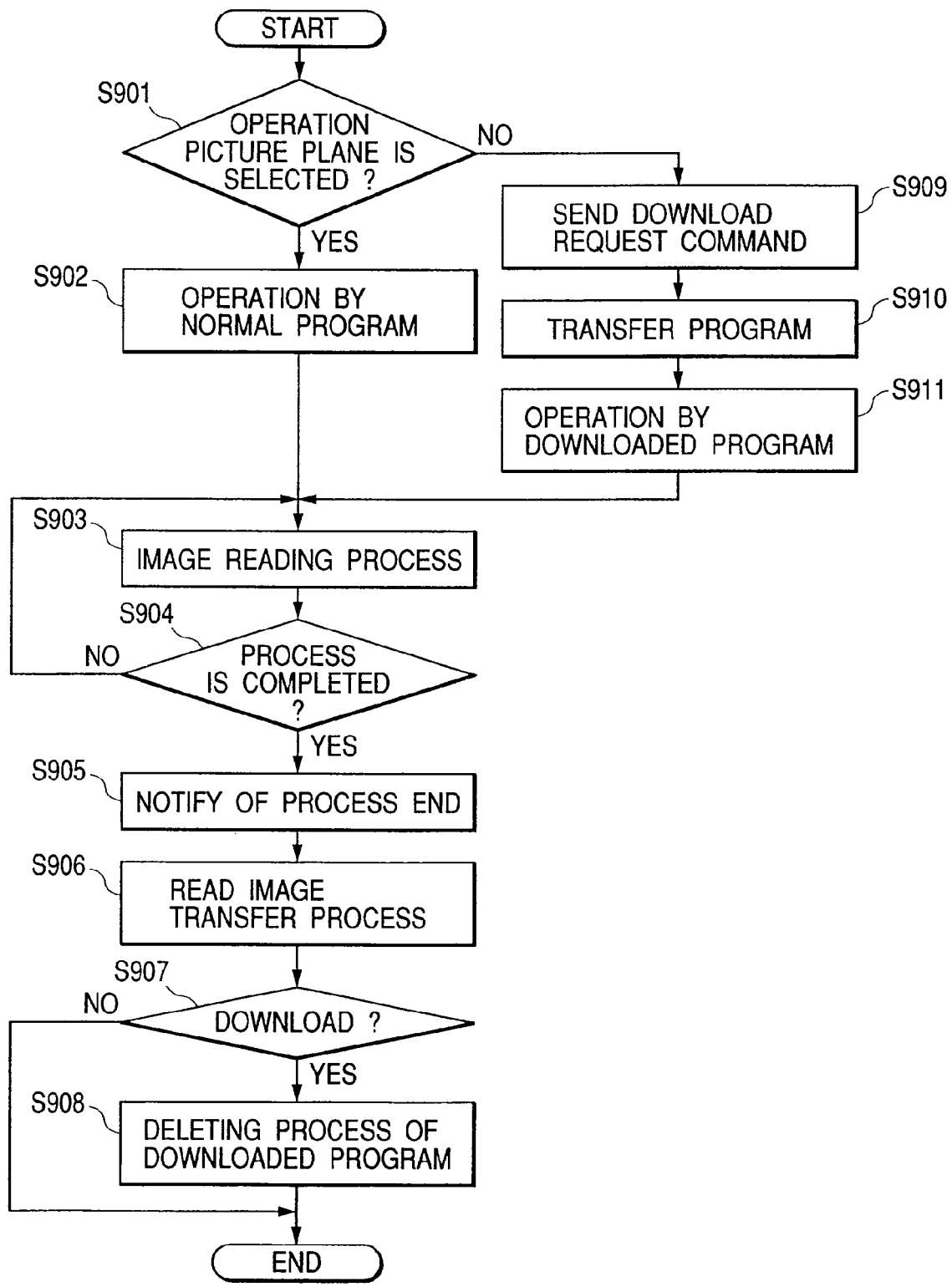
FIG. 9 is a flowchart showing a flow of the operation of a part of the program in an image processing apparatus according to the second embodiment of the invention.

FIG. 9 is a flowchart showing a flow of the operation of a part of the program in the image processing apparatus according to the embodiment of the invention. This flow shows processes which are executed after the command issued in process request command transmitting step S802 in FIG. 8 of the main program 502 on the PC is received by the communication managing unit 601 via the communication interface 206.

In FIG. 9, in step S901, an operation picture plane is selected. In this step, the process request command sent in the process request command transmitting step S802 in FIG. 8 is received, thereby urging the user to select either a mode in which the original reading process is executed by the operating program which the MFP 301 has or a mode in which the program is downloaded from the PC, the downloaded program is executed, and the original reading process is executed. The processing mode is selected via the user interface 106. In the case of using the operating program which the MFP 301 has, the processing routine advances to step S902. In the case of downloading the program, step S909 follows.

In step S902, the operating program which the MFP 301 has inherently is executed. This step is executed by the program managing unit 603 and the original reading operation is executed via the user interface 106.

In step S903, an image reading process for actually reading an image is executed. In this step, the user executes the operating program via the user interface 106 and reads the read image from a desired original. It is assumed that the image is stored into the DISK 210 or the RAM 202 via the data managing unit 602.

In step S904, whether a series of operations of the user has been completed via the user interface 106 or not is detected. If the completion of the processes is detected, step S905 follows. If the completion of the processes is not detected, the processing routine is returned to step S903 and the image reading process is continued.

In step S905, the main program 502 is notified of the end of processes via the communication managing unit 601.

In step S906, the image data stored in the DISK 210 or the RAM 202 via the data managing unit 602 is transferred via the communication managing unit 601 in response to an instruction of the main program 502.

In step S907, whether the program has been downloaded in step S910, which will be explained hereinlater, or not is discriminated. If it has been downloaded, step S908 follows. If it is not downloaded, the present processing operation is finished.

In step S908, the data managing unit 602 is instructed to delete the program downloaded in step S910 mentioned above.

In step S909, the download request command to download the program from the PC is transmitted. In this step, the main program 502 which is operating on the PC is requested to download the program via the communication managing unit 601 and the communication interface 206.

In step S910, the actual program is downloaded and transferred. In this step, the communication managing unit 601 stores the transferred program into the DISK 210 or the RAM 202 via the data managing unit 602.

In step S911, the program transferred and stored in program transfer step S910 is executed. In this step, the program is executed by the program managing unit 603, the original reading operation is executed via the user interface 106, and thereafter, step S903 follows.

According to the invention, as described above, there has been disclosed the network system including: the PC as a preferred example of the information processing apparatus connected to the network; and the scanner, copying apparatus, printing apparatus, image forming apparatus, or the like as a preferred example of the image processing apparatus which can communicate with the PC via the network. For example, there are provided: the mouse, keyboard, and software key input unit for operating a pointer or the like displayed on the monitor and inputting the operation of the scanner; and the controller for controlling the communication interface for controlling the process to transfer the control program for the scanner to the scanner. In accordance with the transfer of the control program which is controlled by the controller, even if there is an input from the mouse, the input from the mouse is limited so as to limit it. The scanner receives and obtains the control program transferred from the PC. The process for displaying the operation which can input a part or all of the operations which are displayed on the screen of the PC and can be inputted by the mouse at this time onto the LCD is controlled by using the control program. On the PC side, in response to the process end notification from the scanner or the instruction input indicative of the end of the process by the user, the end of the operation is recognized. In response to the recognition of the end of the operation, the control program is deleted. The PC is notified of the cancellation of the limitation of the input by the mouse via the communication interface of the scanner. The construction such that in response to the instruction of the user or the end of the process of the program, the display on the LCD of the operating unit of the scanner is changed has been shown.

(Other Embodiments)

Naturally, the object of the invention is also accomplished by a method whereby a memory medium on which program codes of software for realizing the functions of the embodiments mentioned above have been recorded is supplied to a system or an apparatus, and a computer (or a CPU, an MPU, or the like) of the system or the apparatus reads out the program codes stored in the memory medium and executes them.

In this case, the program codes themselves read out from the memory medium realize the functions of the embodiments mentioned above and the memory medium on which the program codes have been stored constructs the invention.

As a memory medium for supplying the program codes, for example, a floppy (registered trademark) disk, a hard disk, a magnetooptic disk, a CD-ROM, a CD-R, a CD-RW, a DVD-ROM, a DVD-RAM, a DVD-RW, a DVD+RW, a magnetic tape, a non-volatile memory card, an ROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes, and the functions of the embodiments mentioned above are realized by those processes.

Further, naturally, the invention also incorporates a case where the program codes read out from the memory medium are written into a memory provided for a function expanding board inserted in a computer or a function expanding unit connected to a computer, thereafter, a CPU or the like provided for the function expanding board or the function expanding unit executes a part or all of actual processes on the basis of instructions of the program codes, and the functions of the embodiments mentioned above are realized by those processes.

As described in detail above, according to the embodiments, the number of reciprocating operations between the information processing apparatus such as a PC or the like and the image processing apparatus can be reduced and the operability is improved.

What is claimed is:

1. A network system including an image processing apparatus connected to a network and an information processing apparatus which can remotely communicate with the image processing apparatus via the network,
   wherein said information processing apparatus comprises:
   memory configured to store a first program and a second program, the first program being provided to present a scanner setting screen including an item for designating a reading attribute of a document to be read by a scanner unit mounted in said image processing apparatus and an item for designating a resolution of the document, and the second program being provided to monitor the status of the first program and acquire an image obtained by reading the document by means of the scanner unit;
   a first display unit configured to display the scanner setting screen; and
   a transfer unit configured to transfer the first program to said image processing apparatus in response to a request from said image processing apparatus, and
   wherein said image processing apparatus comprises:
   a second display unit configured to display a first tab and a second tab on a user interface panel in response to reception of the first program transferred by said transfer unit, the first tab being provided to display a setting screen presented by an image processing application that has been stored in said image processing apparatus, and the second tab being provided to display the scanner setting screen presented by the first program; and
   a scanner unit configured to read a document on the basis of scanner settings set on the scanner setting screen displayed on the user interface panel, and to obtain an image from the document,
   wherein said second display unit displays the scanner setting screen on the user interface panel in response to a user selecting the second tab such that the scanner setting screen is identical to the scanner setting screen displayed by said first display unit, and
   wherein said information processing apparatus further comprises an acquiring unit configured to acquire the image from said image processing apparatus when the second program confirms that the first program which runs on said image processing apparatus has been terminated.

2. A method for a network system including an image processing apparatus connected to a network and an information processing apparatus which can remotely communicate with the image processing apparatus via the network, the method comprising:
   on the information processing apparatus:
   a storing step of storing a first program and a second program, the first program being provided to present a scanner setting screen including an item for designating a reading attribute of a document to be read by a scanner unit mounted in the image processing apparatus and an item for designating a resolution of the document, and the second program being provided to monitor the status of the first program and acquire an image obtained by reading the document by the scanner unit;
   a first displaying step of displaying the scanner setting screen; and
   a transferring step of transferring the first program to the image processing apparatus in response to a request from the image processing apparatus, and
   on the image processing apparatus:
   a second displaying step of displaying a first tab and a second tab on a user interface panel in response to reception of the first program transferred in said transferring step, the first tab being provided to display a setting screen presented by an image processing application that has been stored in the image processing apparatus, and the second tab being provided to display the scanner setting screen presented by the first program; and
   a scanning step of reading a document on the basis of scanner settings set on the scanner setting screen displayed on the user interface panel, and obtaining an image from the document,
   wherein said second displaying step includes displaying the scanner setting screen on the user interface panel in response to a user selecting the second tab such that the scanner setting screen is identical to the scanner setting screen displayed in said first displaying step, and
   wherein the method further comprises, on the information processing apparatus, a an acquiring step of acquiring the image from the image processing apparatus when the second program confirms that the first program which runs on the image processing apparatus has been terminated.

3. A non-transitory computer-readable storage medium storing an executable program for causing a method to be executed on a network system including an image processing apparatus connected to a network and an information processing apparatus which can remotely communicate with the image processing apparatus via the network, the method comprising:
   on the information processing apparatus:
   a storing step of storing a first program and a second program, the first program being provided to present a scanner setting screen including an item for designating a reading attribute of a document to be read by a scanner unit mounted in the image processing apparatus and an item for designating a resolution of the document, and the second program being provided to monitor the status of the first program and acquire an image obtained by reading the document by the scanner unit;
   a first displaying step of displaying the scanner setting screen; and
   a transferring step of transferring the first program to the image processing apparatus in response to a request from the image processing apparatus, and
   on the image processing apparatus:
   a second displaying step of displaying a first tab and a second tab on a user interface panel in response to reception of the first program transferred in said transferring step, the first tab being provided to display a setting screen presented by an image processing application that has been stored in the image processing apparatus, and the second tab being provided to display the scanner setting screen presented by the first program; and a scanning step of reading a document on the basis of scanner settings set on the scanner setting screen displayed on the user interface panel, and obtaining an image from the document, wherein said second displaying step includes displaying the scanner setting screen on the user interface panel in response to a user selecting the second tab such that the scanner setting screen is identical to the scanner setting screen displayed in said first displaying step, and wherein the method further comprises, on the information processing apparatus, a an acquiring step of acquiring the image from the image processing apparatus when the second program confirms that the first program which runs on the image processing apparatus has been terminated.

* * * * *